(12) United States Patent
Khadbai et al.

(10) Patent No.: US 8,814,998 B1
(45) Date of Patent: Aug. 26, 2014

(54) METHOD OF PREPARATION AND APPLICATION FOR FLAME RETARDING COMPOSITION

(71) Applicants: Aziz Khadbai, Plano, TX (US); Joseph Roberts Sparling, McKinney, TX (US); James Burton Anderson, McKinney, TX (US); Ian Douglas Buchanan, McKinney, TX (US)

(72) Inventors: Aziz Khadbai, Plano, TX (US); Joseph Roberts Sparling, McKinney, TX (US); James Burton Anderson, McKinney, TX (US); Ian Douglas Buchanan, McKinney, TX (US)

( * ) Notice: Subject to any disclaimer, the term of this patent is extended or adjusted under 35 U.S.C. 154(b) by 0 days.

(21) Appl. No.: 13/782,187

(22) Filed: Mar. 1, 2013

(51) Int. Cl.
*C09D 5/16* (2006.01)
*C09D 5/18* (2006.01)

(52) U.S. Cl.
CPC ........................................ *C09D 5/18* (2013.01)
USPC .................. 106/18.15; 106/15.05; 106/18.11; 106/18.12; 106/18.13; 106/18.14; 106/18.16; 106/18.18; 106/18.21; 106/18.3; 106/18.31; 106/18.32; 427/421.1; 427/430.1

(58) Field of Classification Search
None
See application file for complete search history.

(56) References Cited

U.S. PATENT DOCUMENTS 3,281,252 A * 10/1966 Fairchild ..................... 106/18.12
5,405,555 A * 4/1995 Riker ............................ 252/607

\* cited by examiner

*Primary Examiner* — Timothy Meeks
*Assistant Examiner* — Michael P Rodriguez
(74) *Attorney, Agent, or Firm* — Maqsood Ahmad

(57) ABSTRACT

The present invention teaches a three-step method for an aqua based chemical composition for flame retardation. The composition comprises: Sodium Borate, Boric Acid, Guanylurea Phosphate, Hydrogen Peroxide, Magnesium Chloride, and Sodium Silicate. The referenced salts are dissolved in distilled water, and the resultant flame retarding solution is coated on substrate surfaces to be protected against flame retardation. The flame retarding composition solution from step-1 alone may be used on non-prepared substrate surfaces. The flame retarding composition solution fully satisfies the Federal Aviation Regulation (FAR) 25.853(a) vertical burn test, and Federal Aviation Regulation (FAR) 25.853(d) heat release test. The utility of the present invention extends to numerous commercial and non-commercial applications.

4 Claims, 3 Drawing Sheets

METHOD OF PREPARATION AND APPLICATION FOR FLAME RETARDING COMPOSITION

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the present invention generally relate to fire or flame retardation. More particularly, the present invention relates to an aqua based chemical composition and method of its application for flame retardation. The chemical composition, without limitations, is effective for flame retardation for a plurality of combustible materials, including, but not limited to, honeycomb non-metallic structural materials, a variety of plastics, synthetic wood, composite materials, and textiles from synthetic or non-synthetic fibers.

BACKGROUND OF THE INVENTION

Many structural or non-structural applications (commercial or non-commercial) may demand the use of combustible materials, including, but not limited to, honeycomb structural non-metallic materials, plastics, synthetic wood, and composite materials for various purposes. For example, weight to strength ratio, other material characteristics, or cost. Fire safety regulations require that combustible materials used in non-commercial or commercial applications be treated with flame retardant chemical compositions. In efforts to comply with these regulations, manufacturers may apply flame retardant compositions to their goods. Unfortunately, many flame retardant compositions are known to be toxic to humans and the environment. For example, fire resistant compositions may include halogenated, particularly those with the halogens chlorine and bromine. Bromine flame retardants (BFRs) and Chlorinated flame retardants (CFRs) are known to cause rapid accumulation inside the human body with critical adverse effects, such as immune system suppression, cancer, endocrine disruption, neurobehavioral and developmental effects. BFRs are used widely in consumer products, especially in plastics for electronics, foams, and textiles. It is also suspected that CFRs used in textiles, paints and coatings, plastics, and insulation foams may cause harm to humans and the environment. It is to be pointed out that non-halogenated flame retardants are needed to reduce or eliminate the use of BFRs and CFRs. Accordingly, there is a need for flame retardants that are not harmful to human beings, or the environment.

The present invention is unique as there is no finding in the prior art that teaches, or suggests flame retarding composition and method of application as it is depicted in the present invention. The present invention uniquely fulfills the aforementioned need effectively and efficiently. The utility of the present invention extends to numerous commercial and non-commercial applications.

SUMMARY OF THE INVENTION

To achieve the forgoing and other objectives and in accordance with the purpose of the present invention, aqua based flame retarding composition and method of its application is presented. It is to be understood that the present invention is not limited to the particular methodology, system, techniques, uses, and applications, described herein, as these may vary. It is also to be understood that the terminology used herein is used for the purpose of describing particular embodiments only, and is not intended to limit the scope of the present invention.

In one embodiment of the present invention, a three-step method for an exemplary sequence of the mode of action for an aqua based flame retarding or inhibiting composition is provided. The composition comprises: Sodium Borate, Boric Acid, Guanylurea Phosphate, Hydrogen Peroxide, Magnesium Chloride, and Sodium Silicate. It is to be understood that the above referenced chemicals or salts are readily water soluble.

In another embodiment of the present invention, step-1 of the method for an exemplary sequence of the mode of action for an aqua based chemical composition comprises: dissolving about 0.45% to about 0.55% by weight of Sodium Silicate, about 1.75% to about 2.25% by weight of Sodium Borate and about 0.80% to about 0.95% by weight of Boric Acid into about 96.25% to about 97.00% by weight of deionized or distilled water. The deionized water temperature is maintained at about 90 degree C. for effectively dissolving the salts in distilled water.

In another embodiment of the present invention, step-2 of the method for an exemplary sequence of the mode of action for an aqua based chemical composition comprises: dissolving, thoroughly, about 1.80 to about 1.90% by weight of Guanylurea Phosphate, about 0.35 to about 0.40% by weight of Hydrogen Peroxide, and about 97.70% to about 97.85% by weight of distilled water. The distilled water temperature is maintained at about 90 degree C. for effectively dissolving the salts in distilled water.

In another embodiment of the present invention, step-3 of the method for an exemplary sequence of the mode of action for an aqua based chemical composition comprises: dissolving, thoroughly, about 1.00% to about 1.16% by weight of Magnesium Chloride in about 98.85% to about 99.00% by weight of distilled water. The distilled water temperature is maintained at about 90 degree C. for effectively dissolving the chemical in distilled water.

In another embodiment of the present invention, the method for an exemplary sequence of the mode of action for an aqua based chemical composition comprises: combining and mixing pre-prepared solutions from step-1, step-2, and step-3 to form a ready to use aqua based flame retardant chemical composition.

In another embodiment of the present invention, the method for an exemplary sequence of the mode of action for an aqua based flame retarding composition solution fully satisfies the Federal Aviation Regulation (FAR) 25.853(a) vertical burn test, and Federal Aviation Regulation (FAR) 25.853(d) heat release test on coupons made from a variety of materials.

In another embodiment of the present invention, a method for an exemplary sequence of the mode of action for preparing the substrate exterior or interior surfaces for the flame retardation composition treatment. The substrate exterior surfaces are prepared by creating micro-voids or micro-cavities by treating the surfaces including mechanical or chemical means.

In another embodiment of the present invention, a device for an exemplary sequence of the mode of action, the aqua based chemical composition for flame retardation is applied to substrate surfaces by coating, painting, dipping or spraying means.

In one embodiment of the present invention, a three-step method (step-1, step-2, and step-3) for an exemplary sequence of the mode of action for a flame retarding or inhibiting composition is provided. The flame retarding composition for the three-step method, without limitation, comprises: Tamol™ 731A (Sodium polyacrylates), Rhodoline® 226/35 (Acrylic Polymer Solution), BYK® 346 (Silicone Surfactant), Titanium Dioxide Pigment, Exolit AP® 422 (Ammonium Polyphosphate), Tech PE® 200 (Mono-Pentacrythritol), Melamine powder, Hydrogen Peroxide, Natrasol® 250 MXR (Hydroxyethyl Cellulose), Texanol™ (Ester Alcohol), StanChem® 5174 (Acrylic Copolymer Emulsion), Scotchlite™ K25 (Soda Lime Borosilicate Glass), Acrysol™ RM-8W (Hydrophobically Modified Ethylene Oxide Urethane) and Distilled Water.

In another embodiment of the present invention, the method for an exemplary sequence of the mode of action for flame retarding composition comprises: mixing about 10% to about 20% by weight of Ammonium Polyphosphate, about 4% to about 5% by weight of Sodium Borate, about 4% to about 5% by weight of % by weight of Boric Acid, about 0.8% to about 1.0% by weight of 3% Hydrogen Peroxide Solution, and about 69% to about 81.2% by weight of distilled water. The distilled water temperature is maintained to about 90 degree C. for effectively dissolving the chemical compounds in distilled water.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE EMBODIMENTS

Figure 1:
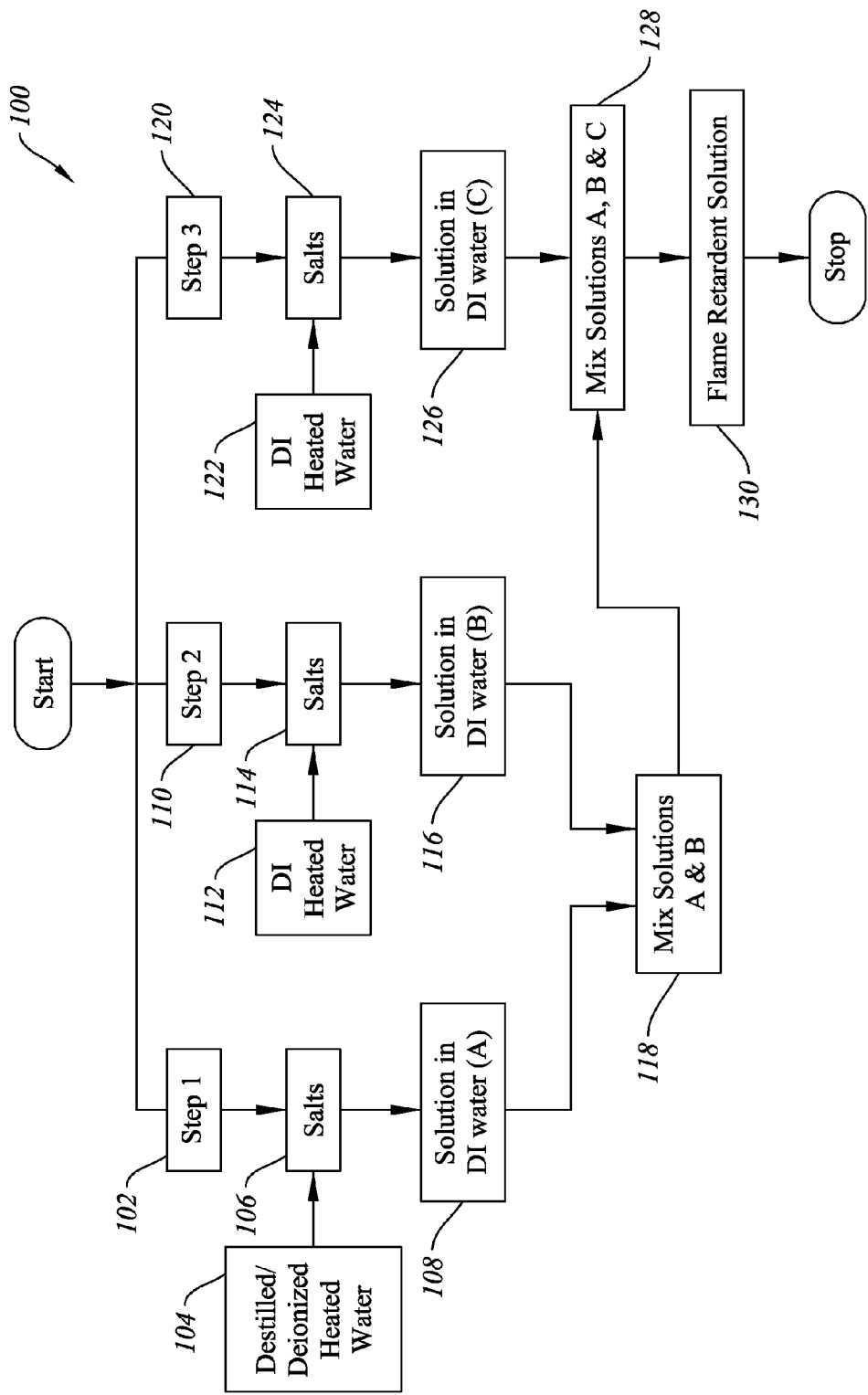
FIG. 1 is an illustration of exemplary schematic depicting the process for preparing the aqua based flame retarding composition solution.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it must be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From the present disclosure, other variations and modifications will be apparent to persons skilled in the art. Such variations and modifications may involve equivalents and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be devised to such features or any combination combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As it is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved or optimized by those skilled in the art, using their average skills and known techniques, to achieve the desired implementation that addresses the needs of the particular application.

It is to be understood that any exact measurements or dimensions, or particular construction materials indicated herein are solely provided as examples of suitable configurations and are not intended to be limiting in any manner. Depending on the needs of the particular application, those skilled in the art will readily recognize, in light of the following teachings, a multiplicity of suitable alternative implementation details.

It is, specifically, emphasized that any teaching or combination of teachings, any novel feature, or any novel combination of features including the novel processing mechanism, or any combination of novel processing mechanisms for the aqua based flame retardant solution and its method of preparation and application, in accordance with an embodiment of the present invention, is clearly distinguished form the prior art, because no prior art is found either alone or in combination that teaches all of the features of the present invention.

To achieve the forgoing and other objectives and in accordance with the purpose of the present invention, an aqua based flame retardant solution and its method of application is presented. It is to be understood that the present invention is not limited to the particular methodology, system, techniques, uses, and applications, described herein, as these may vary. It is to be understood that the terminology used herein is used for the purpose of describing particular embodiments only, and is not intended to limit the scope of the present invention. The present invention is illustrated by way of example, and not by way of limitation, in the figures of the accompanying drawings and in which like reference numerals refer to similar elements and in which:

FIG. 1 is an illustration of exemplary schematic depicting the process for preparing the flame retarding aqua based chemical composition for in accordance with an embodiment of the present invention. The schematic 100 illustrates an integrated three-step process for the flame retarding aqua based chemical composition. The schematic 100 depicts step-1 102 in which distilled or deionized water 104 is added to the salts 106. The salts 106 comprise: about 0.45% to about 0.55% by weight of Sodium Silicate, about 1.75% to about 2.25% by weight of Sodium Borate and about 0.80% to about 0.95% by weight of Boric Acid is dissolved in about 96.25% to about 97.00% by weight of deionized/distilled water to form solution 108. The distilled water 104 temperature is maintained at about 90 degree C. for effectively dissolving the salts 106 in distilled water 104. The solution (designated as solution A) 108 may be used in its present form in certain applications, for example, unfinished substrate surfaces, or where substrate surface preparation is not feasible.

Referring again to FIG. 1, in one embodiment of the present invention, the schematic 100 depicts step-2 110 in which distilled or deionized water 112 is added to the salts 114. The salts 114 comprise: about 1.80 to about 1.90% by weight of Guanylurea Phosphate, about 0.35 to about 0.40% by weight of Hydrogen Peroxide are dissolved in about 97.70% to about 97.85% by weight of distilled water. The distilled water 112 temperature is maintained at about 90 degree C. for effectively dissolving the salts/chemicals in distilled water 112 to form solution (designated as solution B) 116.

Referring again to FIG. 1, in one embodiment of the present invention, the schematic 100 depicts step-3 120 in which distilled or deionized water 122 is added to the salts 124. The salt 124 comprises: about 1.00% to about 1.16% by weight of Magnesium Chloride which is dissolved in about 98.85% to about 99.00% by weight of distilled water 122. The distilled water 122 temperature is maintained at about 90 degree C. for effectively dissolving the salt 124 in distilled water 122 to form solution (designated as solution C) 126.

Summarily: Referring again to FIG. 1, in one embodiment of the present invention, the solution 108 from step-1 102, and the solution 116 from step-2 are mixed together to form the solution 118. The solution 118 is then mixed with the solution 126 from step-3 to form solution 128 as the general purpose flame retardant solution 130. It is to be pointed out that the solution 108, without combining with the solution 116 and the solution 126, may be used for in its present form in certain applications, for example, unfinished substrate surfaces, or where substrate surface preparation is not feasible.

Figure 2:
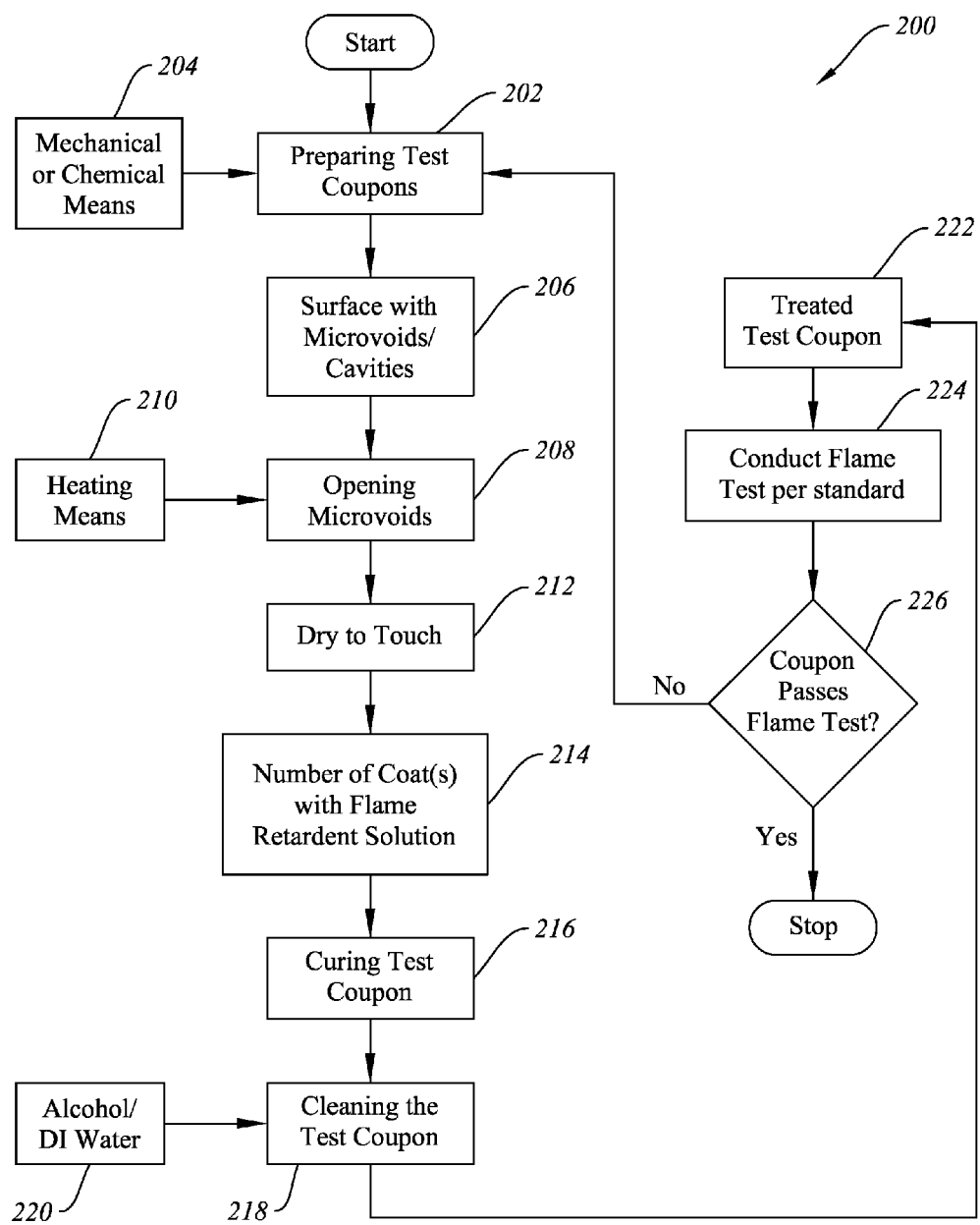
FIG. 2 is an illustration of exemplary schematic depicting the process for preparing test coupons for the flammability testing.

FIG. 2 is an illustration of exemplary schematic 200 depicting the process for preparing test coupons 202 for flammability testing under the selected standard. The test coupons 202 are prepared by using mechanical or chemical means 204. The mechanical or chemical means 204 may include, but not limited to, sanding or chemical etching of the coupon or substrate surfaces. The objective of mechanical or chemical treatment is to create micro-voids 206 on coupons or substrate surfaces. The micro-voids 206 are further opened or enlarged 208 by appropriate heating means 210. The appropriate heating means 210 may include, but not limited to, convection or conduction process such as flame heating. The dry to touch process 212 is performed to the opened or enlarged 208 surfaces. Preceding the dry to touch process 212, the coupon or substrate surfaces are coated with the flame retardant solution 214. The coupon or substrate surfaces coated with the flame retardant solution 214 are subjected to the curing process 216. The cured coupons or surfaces are cleaned 218 using alcohol or distilled water 220. The treated test coupons are then subjected to the flame test 224. If the coupons pass the flame test 226, per specific flame test standard, the test is concluded as successful. Otherwise, the coupons flammability test is repeated using new coupons treated with additional number of flame retardant solution coatings.

Figure 3:
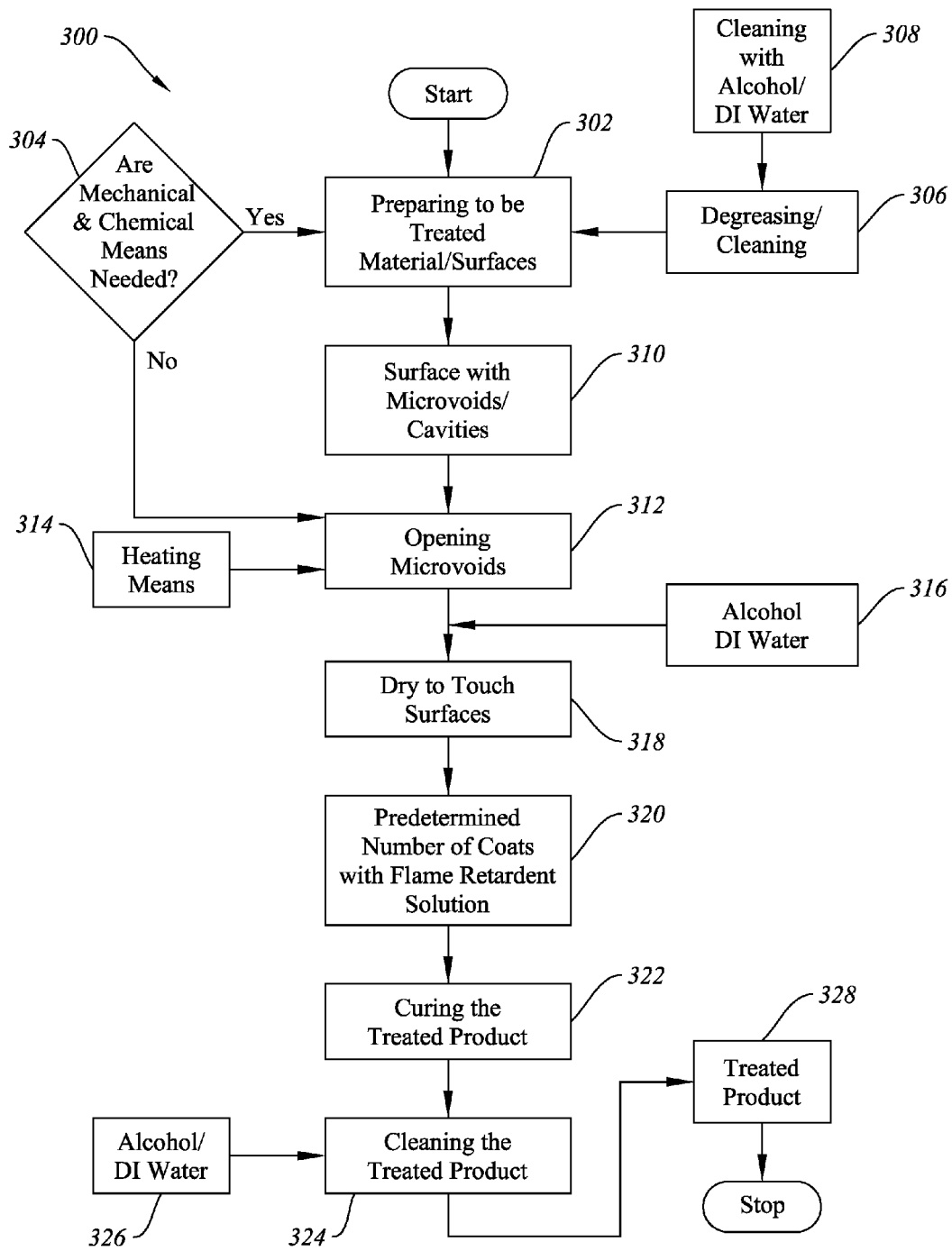
FIG. 3 is an illustration of exemplary schematic depicting the process for applying the aqua based flame retarding composition solution on to be treated substrate surfaces.

FIG. 3 is an illustration of exemplary schematic 300 depicting the process for treating materials or substrate surfaces 302 with the flame retardant solution. Mechanical or chemical means 304 may be needed to prepare the materials or substrate surfaces 302. Prior to flame retardant solution application, the materials or substrate surfaces 302 are degreased 306, or cleaned 308. Both, non-treated surfaces, or surfaces treated with mechanical or chemical means 304 are heat treated by heating means 314 to further open the micro-voids 312 and then cleaned with alcohol or distilled water 316. The cleaned surfaces are dried to touch 318. The dried to touch surfaces 318 are then treated with pre-determined number of coating(s) of flame retardant solution 320. The flame retardant treated surfaces 320 are subjected to curing treatment 322. The cured surfaces 322 are cleaned 324 with alcohol or distilled water 326 for a finished treated product 328.

It is to be pointed out that an extensive series of test results yield that treated product, or coupons with flame retardant solution, for example 1018, 118, or 130 successfully passes the Federal Aviation Regulation (FAR) 25.853(a) vertical burn, and Federal Aviation Regulation (FAR) 25.853(d) heat release tests.

We claim:

1. A method of preparing a flame retarding composition comprising:

preparing a first solution by dissolving about 0.45% to about 0.55% by weight of Sodium Silicate, about 1.75% to about 2.25% by weight of Sodium Borate, and about 0.80% to about 0.95% by weight of Boric Acid in about 96.25% to about 97.00% by weight of distilled water heated to about 90 degrees C.;

preparing a second solution by dissolving about 1.80% to about 1.90% by weight of Guanylurea Phosphate, about 0.35% to about 0.40% by weight of Hydrogen Peroxide, and about 97.70% to about 97.85% by weight of distilled water heated to about 90 degrees C.;

preparing a third solution by dissolving about 1.00% to about 1.16% by weight of Magnesium Chloride in about 98.84% to about 99.00% by weight of distilled water heated to about 90 degrees C.;

mixing said first and said second solutions to obtain a fourth solution;

mixing said third solution with said fourth solution to obtain a flame retardant solution;

preparing a substrate to be treated with said flame retardant solution; and treating said substrate with said flame retardant solution.

2. The method of claim 1, wherein the step of preparing the substrate is achieved by mechanical or chemical processing means.

3. The method of claim 1, wherein the step of treating the substrate with said flame retardant solution is achieved by coating, dipping, or spraying means.

4. The method of claim 1, wherein the substrate is a fabric material, and wherein the step of treating the substrate with said flame retardant solution is achieved by coating, dipping, or spraying means.

* * * * *